(12) United States Patent
Taggart et al.

(10) Patent No.: US 9,452,440 B2
(45) Date of Patent: Sep. 27, 2016

(54) MULTI-CHAMBERED BOTTLE WITH METERING STAGE, POUR SPOUT AND CAP

(71) Applicant: Triumph Pharmaceuticals Inc., St. Louis, MO (US)

(72) Inventors: Jeffrey Silver Taggart, Cleveland Heights, OH (US); Robert Vystrcil, Garrettsville, OH (US); Trevor L. Jackson, Kirtland, OH (US); Rachel Nottingham Colosimo, Cleveland Heights, OH (US)

(73) Assignee: Triumph Pharmaceuticals Inc., St. Louis, MO (US)

( * ) Notice: Subject to any disclaimer, the term of this patent is extended or adjusted under 35 U.S.C. 154(b) by 142 days.

(21) Appl. No.: 14/283,847

(22) Filed: May 21, 2014

(65) Prior Publication Data

US 2015/0336122 A1 Nov. 26, 2015

(51) Int. Cl.
| | |
|---|---|
| *B67D 7/78* | (2010.01) |
| *B05B 11/00* | (2006.01) |
| *B65D 83/28* | (2006.01) |
| *B65D 83/34* | (2006.01) |
| *B65D 83/40* | (2006.01) |
| *B65D 81/32* | (2006.01) |
| *B65D 83/68* | (2006.01) |
| *G01F 1/00* | (2006.01) |
| *B65D 1/04* | (2006.01) |
| *B65D 47/06* | (2006.01) |

(52) U.S. Cl.
CPC ....... *B05B 11/0078* (2013.01); *B65D 81/3283* (2013.01); *B65D 83/28* (2013.01); *B65D 83/345* (2013.01); *B65D 83/40* (2013.01); *B65D 83/68* (2013.01); *G01F 1/00* (2013.01); *B65D 1/04* (2013.01); *B65D 47/06* (2013.01)

(58) Field of Classification Search
CPC ..... B05B 11/0078; B01F 3/002; B65D 1/04; B65D 81/3283; B65D 83/28; B65D 83/345; B65D 93/40; B65D 83/68; B65D 47/06; G01F 1/00
USPC ...................................... 222/145.3
See application file for complete search history.

(56) References Cited

U.S. PATENT DOCUMENTS

| | | | |
|---|---|---|---|
| 3,729,553 A * | 4/1973 | Gold ............... | A61K 8/046 222/94 |
| 5,289,950 A | 3/1994 | Gentile | |
| 5,346,097 A | 9/1994 | Melland et al. | |
| 5,392,947 A * | 2/1995 | Gentile ............... | A61K 8/19 215/6 |
| 5,579,957 A | 12/1996 | Gentile et al. | |
| 5,934,515 A | 8/1999 | Bennett | |

(Continued)

*Primary Examiner* — Patrick M Buechner
*Assistant Examiner* — Jeremy W Carroll
(74) *Attorney, Agent, or Firm* — Harness, Dickey & Pierce, P.L.C.

(57) ABSTRACT

A multi-chambered bottle includes first and second chambers, a metering stage, a pour spout and a cap. The metering stage includes first and second metering stage sections connectable to respective mouths of the first and second chambers. Each metering stage section comprises a nozzle having a liquid inlet orifice and a liquid outlet orifice, and a vent tube having an air inlet orifice and an air outlet orifice at opposite ends of the vent tube, the air inlet orifice to be disposed outside of the respective chamber and the air outlet orifice to be disposed inside of the respective chamber, the vent tube disposed relative to the nozzle such that a line crossing a center of the air inlet orifice and a center of the liquid outlet orifice forms an acute angle with a normal axis of the bottle.

23 Claims, 17 Drawing Sheets

(56) References Cited

U.S. PATENT DOCUMENTS

| | | |
|---|---|---|
| 5,954,213 A | 9/1999 | Gerhart et al. |
| 6,283,385 B1 | 9/2001 | Beaver et al. |
| 6,341,716 B1 | 1/2002 | Goettner et al. |
| 6,439,433 B1 * | 8/2002 | Dubach ............... B65D 47/06 222/145.3 |
| 8,413,849 B2 | 4/2013 | Flores |
| 2001/0013523 A1 | 8/2001 | Gross et al. |
| 2004/0026535 A1 * | 2/2004 | Conway ............... C11D 17/041 239/433 |
| 2006/0180617 A1 | 8/2006 | Suffa |
| 2007/0000945 A1 | 1/2007 | Geberzahn et al. |
| 2007/0012806 A1 | 1/2007 | Muhlhausen et al. |
| 2007/0029275 A1 * | 2/2007 | Hantman ............ B29C 49/0078 215/6 |
| 2007/0029344 A1 | 2/2007 | Schymitzek et al. |
| 2007/0158461 A1 | 7/2007 | Rymer et al. |
| 2007/0199953 A1 | 8/2007 | Laveault et al. |
| 2007/0278174 A1 * | 12/2007 | Kunz .................. B65D 50/046 215/224 |

* cited by examiner

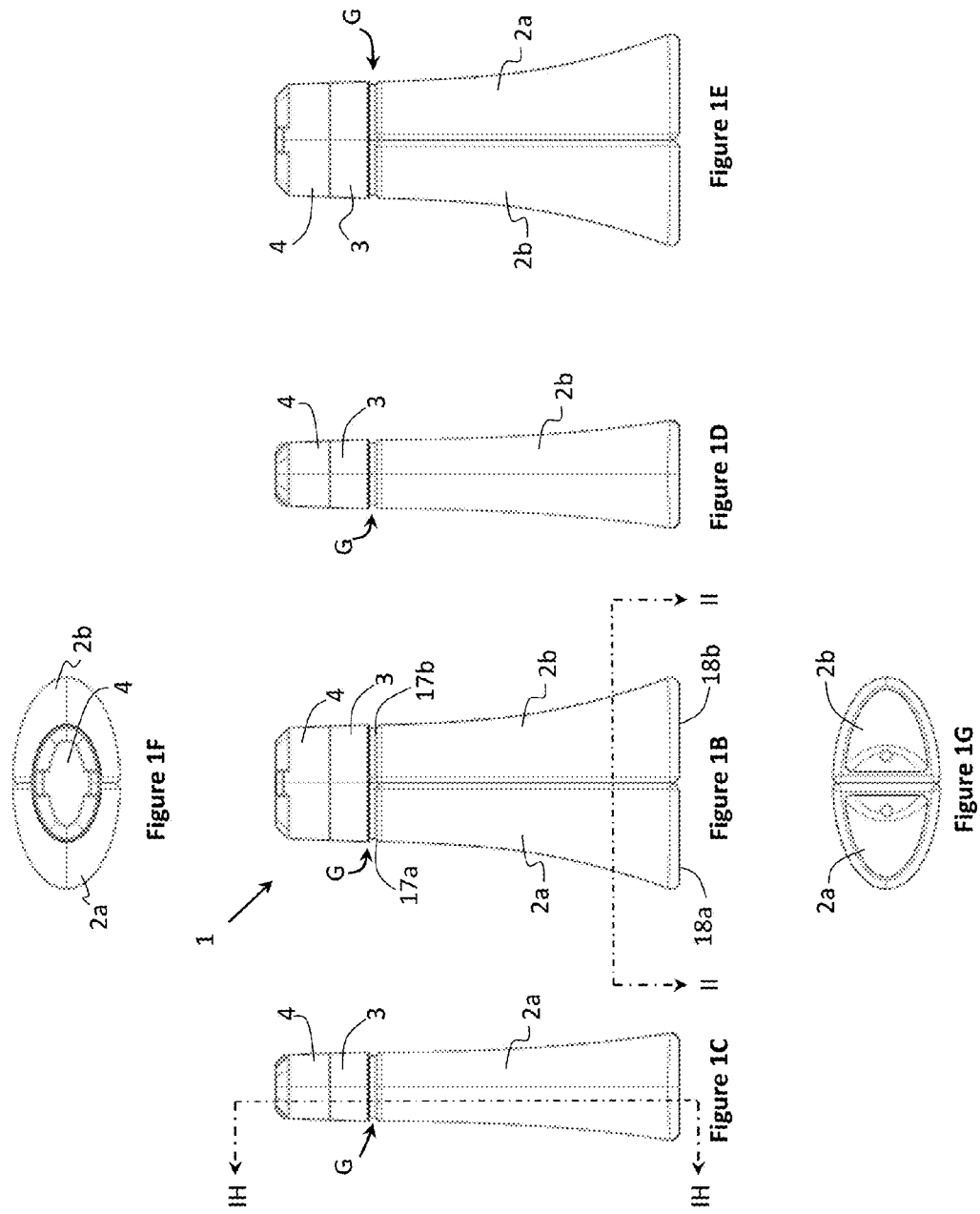

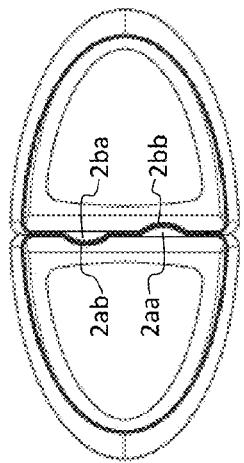
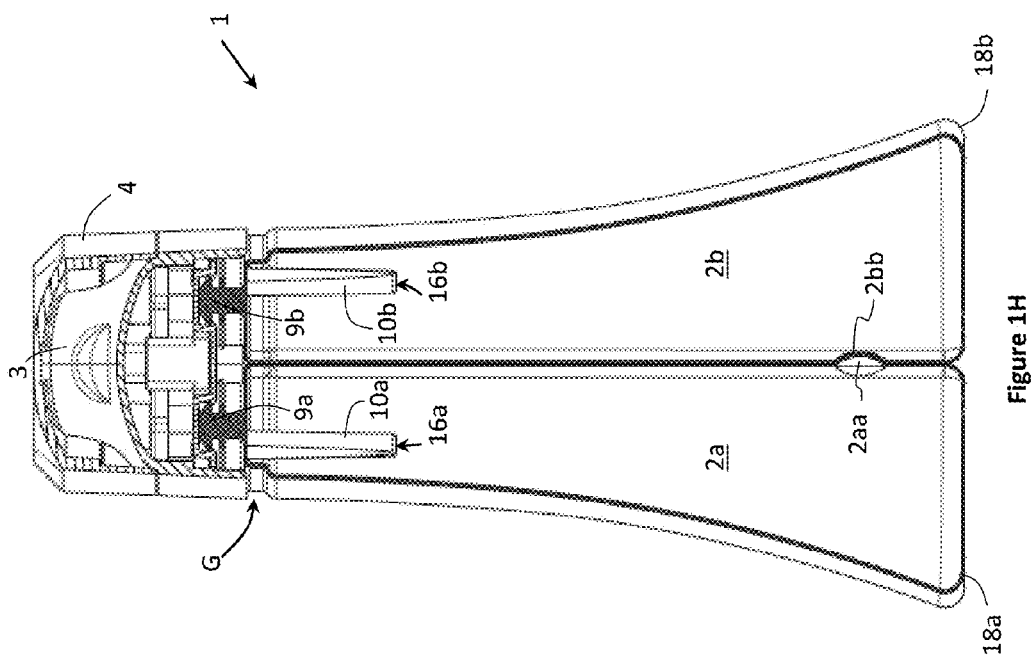

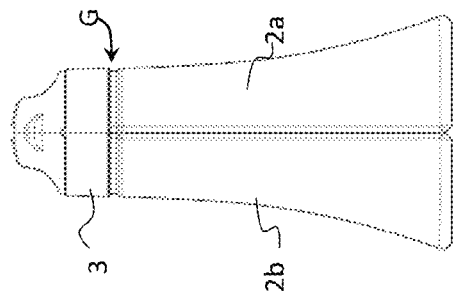
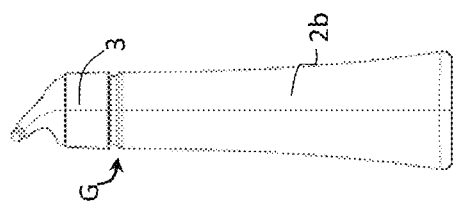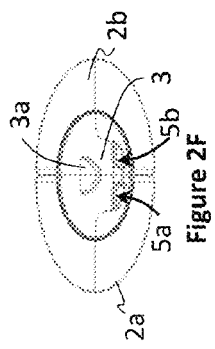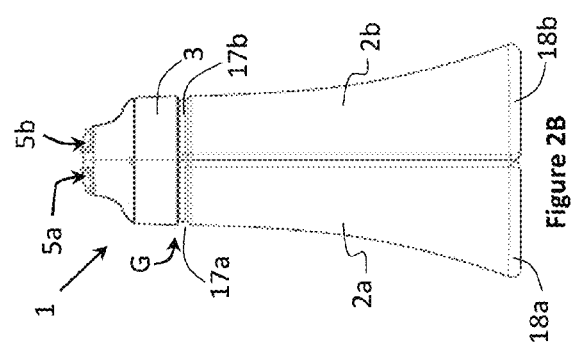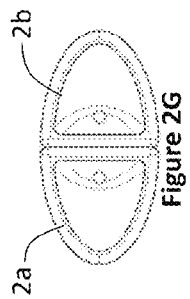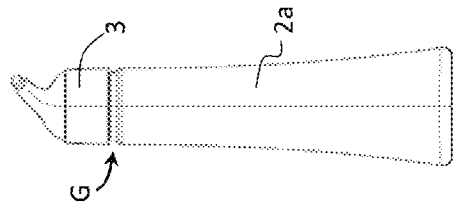

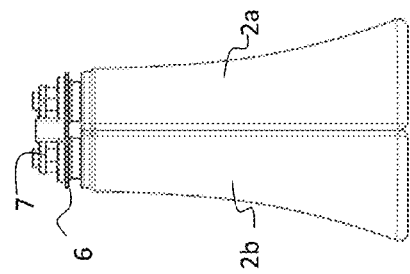
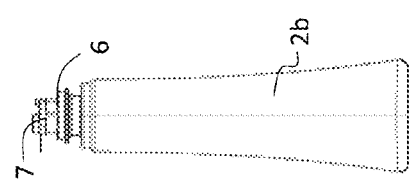
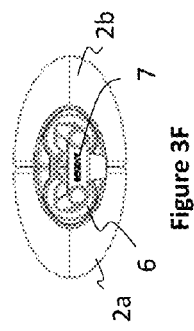
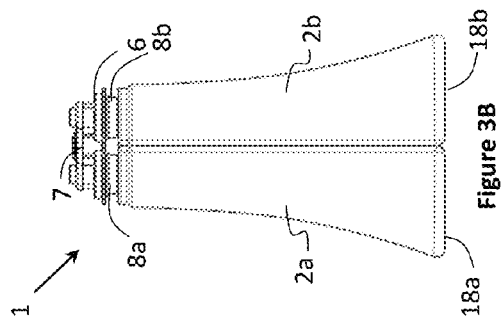
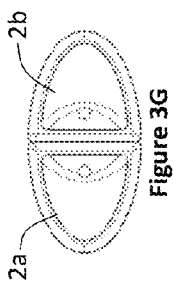
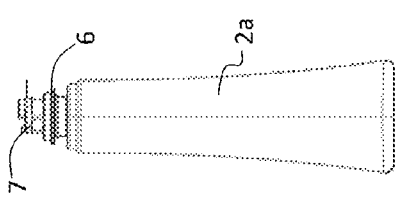

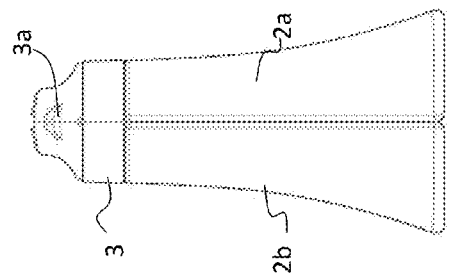
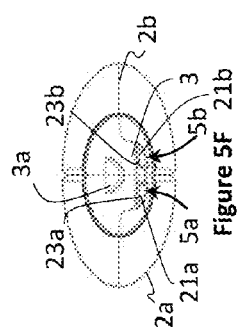
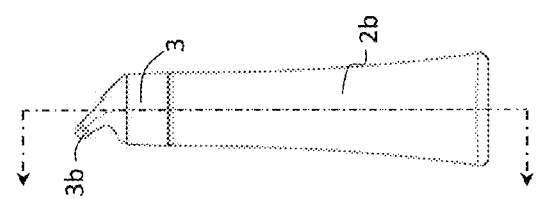
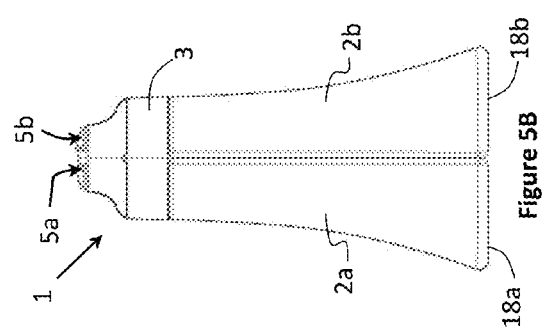
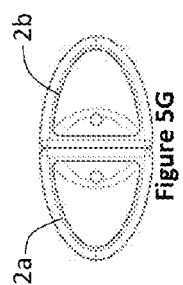
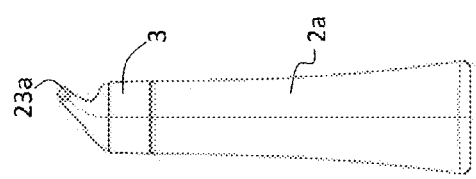

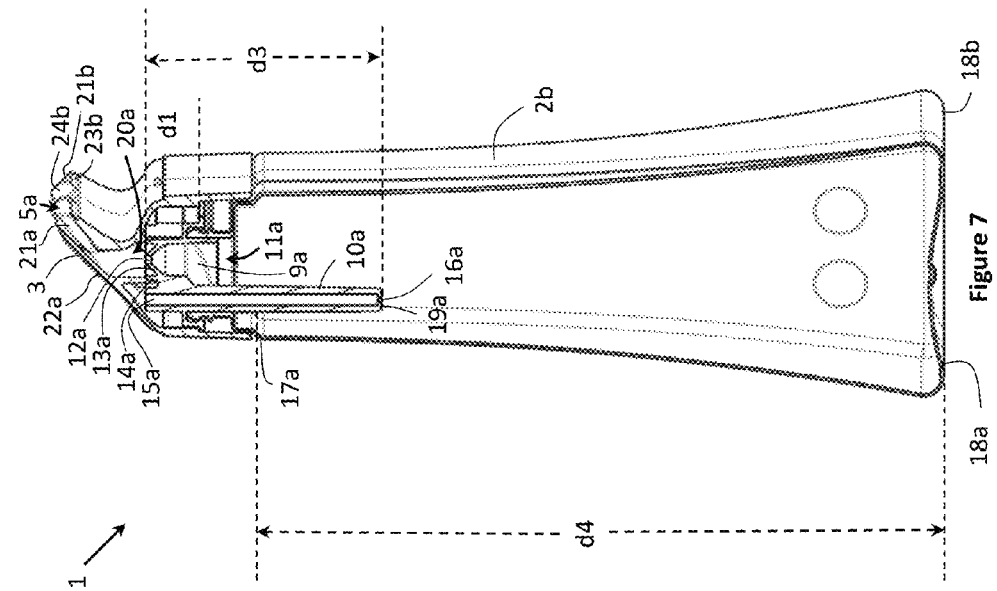
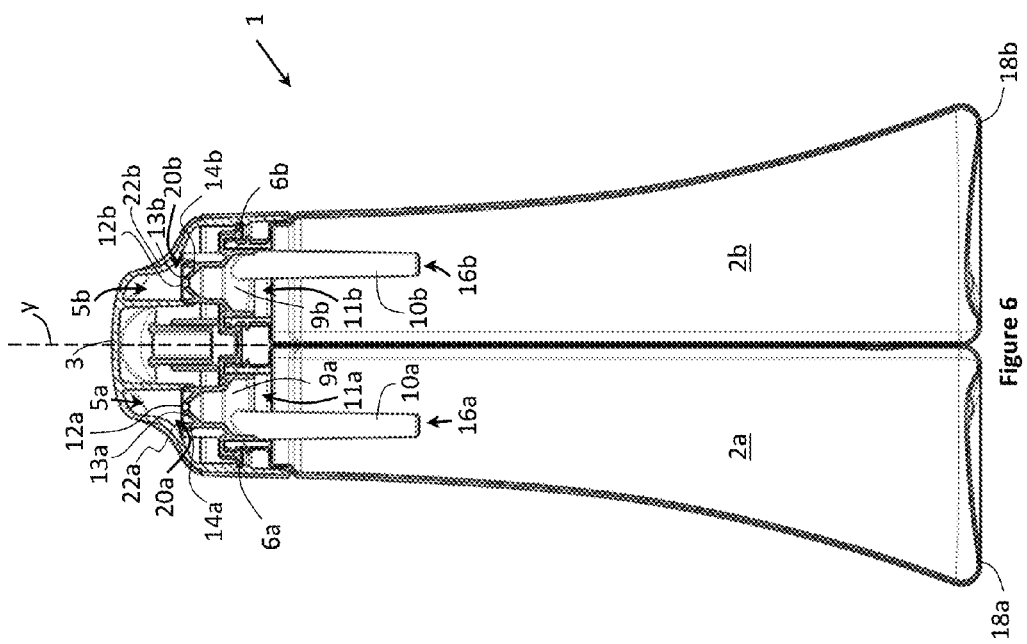

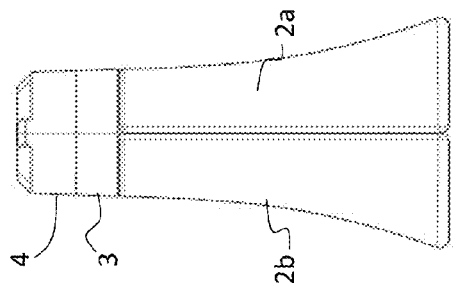
Figure 11E
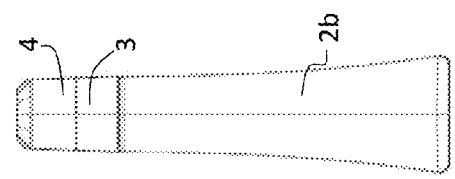
Figure 11D
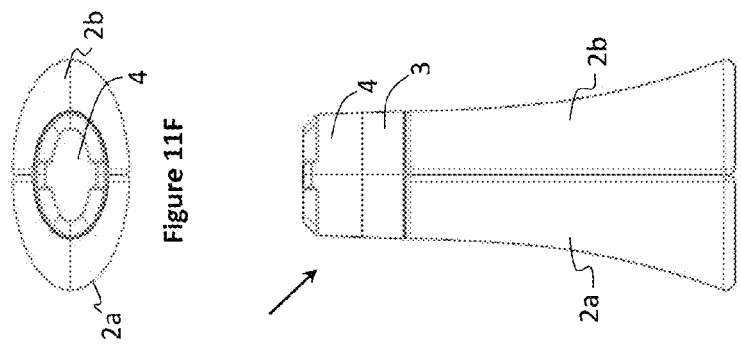
Figure 11F
Figure 11B
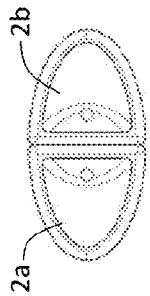
Figure 11G
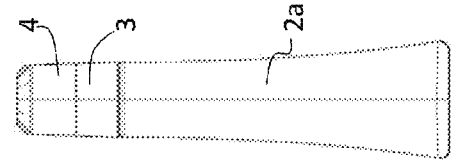
Figure 11C

MULTI-CHAMBERED BOTTLE WITH METERING STAGE, POUR SPOUT AND CAP

FIELD OF THE INVENTION

The present disclosure relates generally to a bottle for holding and dispensing liquids. In particular, the present disclosure relates to a bottle with a metering stage, pour spout and cap.

BACKGROUND

In the dispensing of modern liquid products, keeping components of a liquid product separate until just before dispensing the components into the final product may be desirable. For example, keeping two components of a mouthwash separate prior to dispensing the product may be necessary to prevent undesirable, premature reaction of the components. Other consumer products examples where keeping ingredients separate may be desirable include surfactant and conditioner ingredients in shampoos and surfactant and moisturizer ingredients in shower gels.

In some cases it is not only important that the components meet only after they have exited the bottle, but also that one component does not contaminate another within the bottle. After dispensing, some residue of one or another component may remain in the dispensing area of the bottle. This may create a risk of cross-contamination where one liquid component may enter the chamber in which another liquid is kept.

In some applications the specific ratio of one component to another may be important for the final product to be effective and not be too diluted or concentrated. Conventionally, metering of the ratio of one component to another is a challenge particularly because, since the bottle is tipped for dispensing by a user, the tipping angle of the bottle is highly uncontrolled.

Therefore, a need exists for an improved multi-chambered bottle that a) dispenses separately stored components for them to mix into a single product stream, b) reduces or eliminates the risk of cross-contamination, c) accurately meters the ratio of one component to the other regardless of the tipping angle, and d) may be manufactured cost-effectively.

SUMMARY OF THE INVENTION

This disclosure provides a multi-chambered bottle that includes first and second chambers, a metering stage, a pour spout and a cap. The particular design of the metering stage and the pour spout encourages smooth liquid flow so that the liquid components may dispense separately. In one embodiment, at least two of the liquid components mix "in the air" into a single product stream prior to landing in an application container. The particular design of the metering stage and the pour spout also encourages fluid flow exclusively in the outward direction and discourages the component liquids from reentering the chambers to prevent self-contamination and/or cross-contamination. The particular design of the metering stage and the pour spout also accurately meters the ratio of one component to another regardless of the tipping angle. The multi-chambered bottle of the present disclosure may also be manufactured cost effectively.

These and further features of the present invention will be described with reference to the attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIGS. 1B-1G respectively illustrate front, left side, right side, rear, top and bottom views of the exemplary multi-chambered bottle of FIG. 1A.

FIG. 1H illustrates a cross-sectional view of the exemplary multi-chambered bottle taken along line IH-IH of FIG. 1C.

FIG. 1I illustrates a cross-sectional view of the exemplary multi-chambered bottle taken along line II-II of FIG. 1B.

FIGS. 2B-2G respectively illustrate front, left side, right side, rear, top and bottom views of the exemplary multi-chambered bottle of FIG. 2A.

FIGS. 3B-3G respectively illustrate front, left side, right side, rear, top and bottom views of the exemplary multi-chambered bottle of FIG. 3A.

FIGS. 5B-5G respectively illustrate front, left side, right side, rear, top and bottom views of the exemplary multi-chambered bottle of FIG. 5A.

FIG. 6 illustrates a cross-sectional view of the exemplary multi-chambered bottle taken along line VI-VI of FIG. 5D.

FIG. 7 illustrates a cross-sectional view of the exemplary multi-chambered bottle taken along line VII-VII of FIG. 5H.

FIGS. 11B-11G respectively illustrate front, left side, right side, rear, top and bottom views of the exemplary multi-chambered bottle of FIG. 11A.

DETAILED DESCRIPTION

Figure 1A:
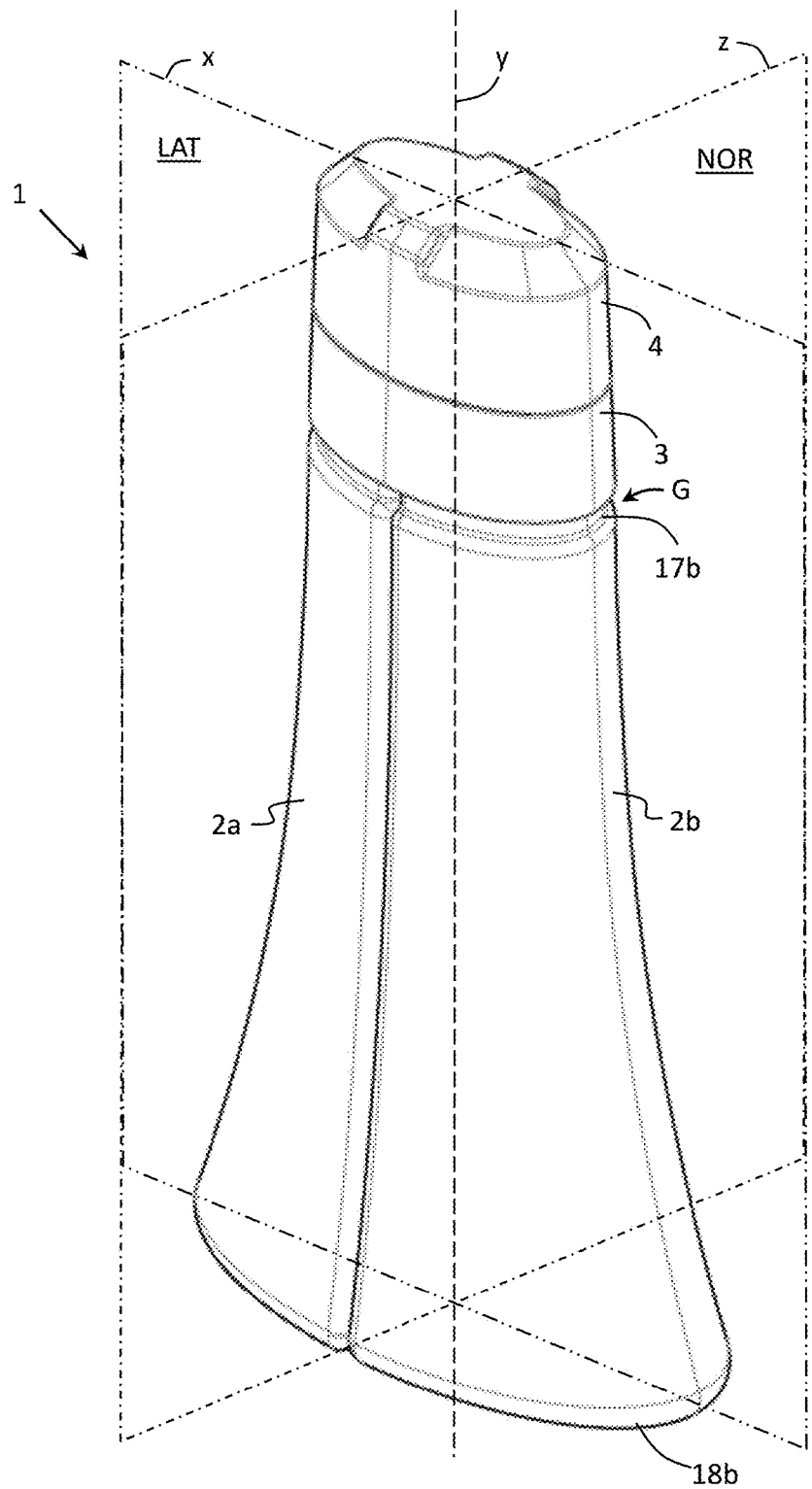
FIG. 1A illustrates a front perspective view of an exemplary multi-chambered bottle.
Figure 2H:
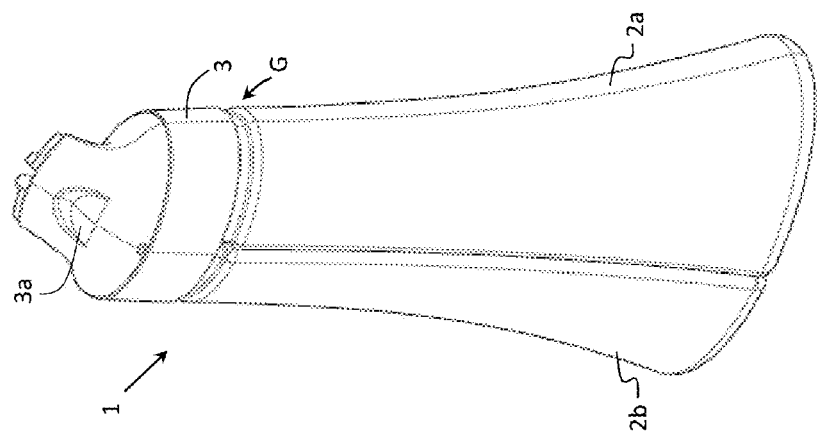
FIG. 2H illustrates a rear perspective view of the exemplary multi-chambered bottle of FIG. 2A.
Figure 2A:
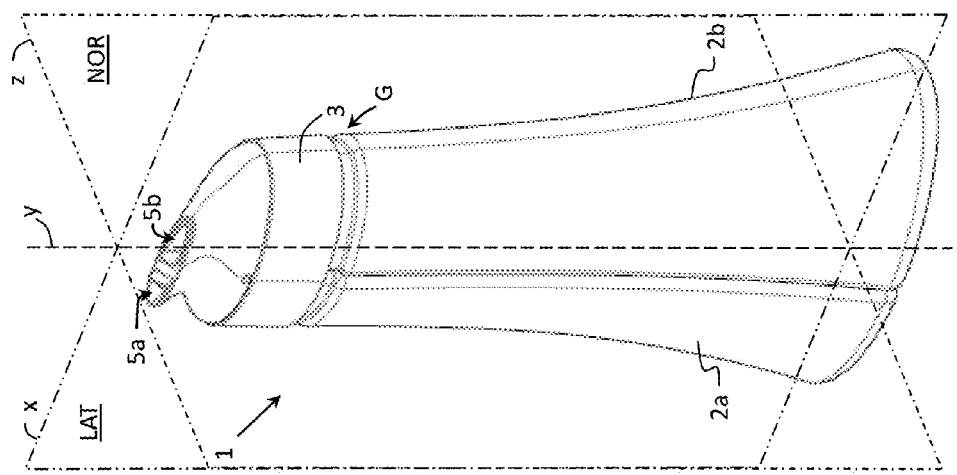
FIG. 2A illustrates a front perspective view of an exemplary multi-chambered bottle without its cap.
Figure 3A:
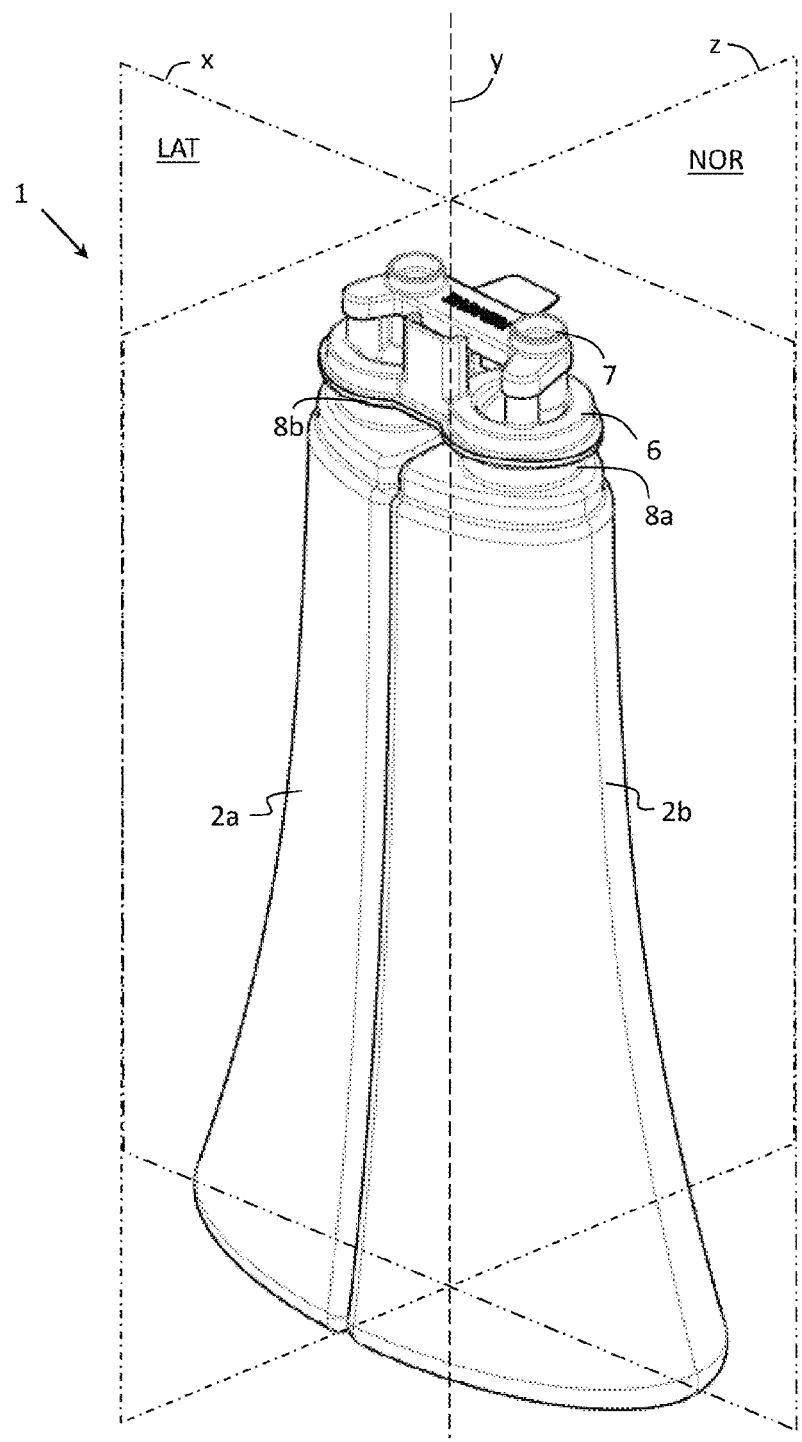
FIG. 3A illustrates a front perspective view of an exemplary multi-chambered bottle without its cap or pour spout.
Figure 4A:
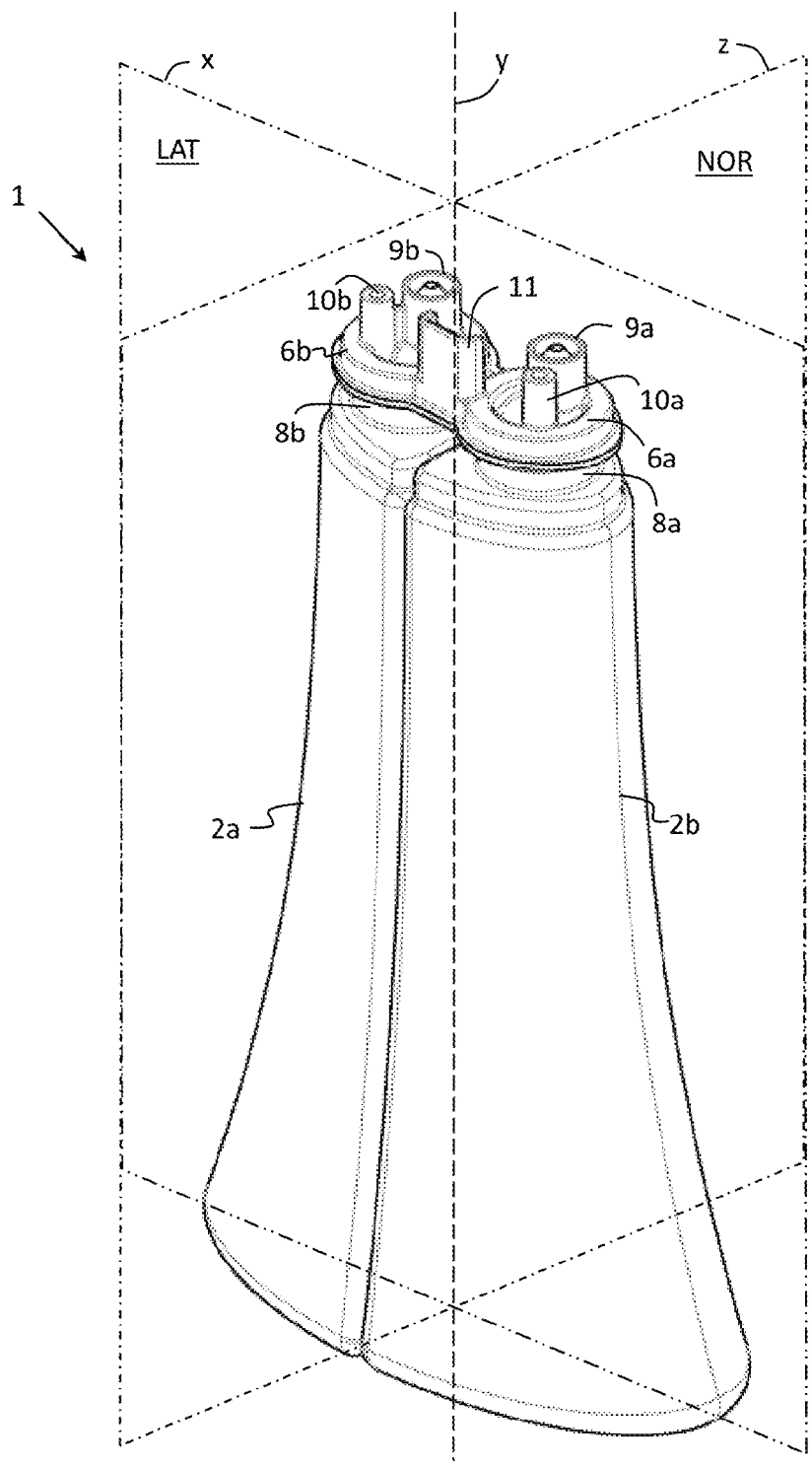
FIG. 4A illustrates a front perspective view of an exemplary multi-chambered bottle without its cap, pour spout or sealing cover.
Figure 4E:
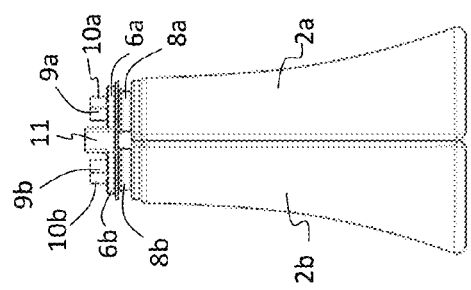
FIGS. 4B-4G respectively illustrate front, left side, right side, rear, top and bottom views of the exemplary multi-chambered bottle of FIG. 4A.
Figure 4D:
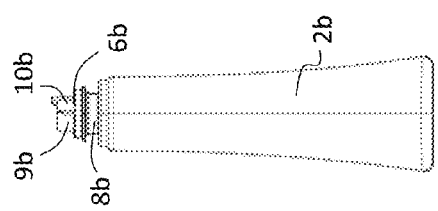
Figure 4F:
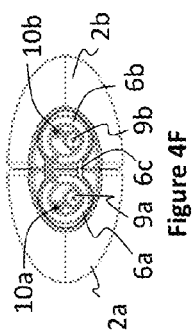
Figure 4B:
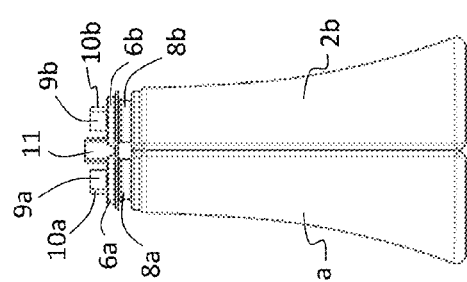
Figure 4G:
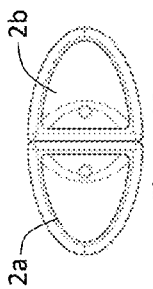
Figure 4C:
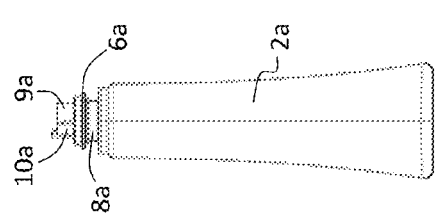

FIGS. 1A-11G illustrate various views of an exemplary multi-chambered bottle 1. For ease of illustration, as shown in FIG. 1A we define a) a lateral center plane LAT, including a lateral axis x and a longitudinal axis y, that cuts the bottle 1 into front and back portions, and b) a normal center plane NOR, including a normal axis z and the longitudinal axis y, that cuts the bottle 1 into left and right portions.

FIGS. 1A-1G illustrate the bottle 1 in a configuration in which the bottle 1 may be sold or stored prior to sale or distribution. The bottle 1 includes two chambers 2a and 2b that may hold respective liquids to be poured and mixed. The bottle 1 also includes a pour spout 3 that, as described in detail below, assists in pouring and mixing of the liquids from the chambers 2a and 2b. Although, for purposes of explanation, the bottle 1 is disclosed herein as including two chambers 2a and 2b, in some embodiments, the bottle 1 may include more than two chambers. Further, while the bottle 1 is disclosed herein as a single bottle 1 including two chambers 2a and 2b, in some embodiments, the bottle 1 may be a unit that incorporates two or more bottles joined together.

In the illustrated embodiment, the first and second chambers 2a and 2b are separated by the normal-center plane NOR. The chamber 2a includes at least one wall that slopes in a direction towards the normal-center plane NOR of the bottle 1 as it extends from a base 18a to a shoulder 17a of the chamber 2a. The chamber 2b includes at least one wall that slopes in a direction towards the normal-center plane NOR of the bottle 1 as it extends from a base 18b to a shoulder 17b of the chamber 2b. In other embodiments, the chambers 2a and 2b may be of different shapes from those illustrated.

FIGS. 1H and 1I illustrate cross-sectional views of the exemplary multi-chambered bottle taken along line IH-IH of FIG. 1C and line II-II of FIG. 1B, respectively. In the illustrated embodiment of FIGS. 1H and 1I, the first and the second chambers 2a and 2b each includes a first nesting portion 2aa, 2ba that protrudes from the respective chamber and a second nesting portion 2ab, 2bb that accepts the first nesting portion of the opposite chamber. This prevents the chambers from shifting front to back relative to each other. In one embodiment (not shown), the bottle 1 includes only one set of protruding and accepting nesting portions while, in another embodiment (not shown), the bottle 1 includes more than two sets of protruding and accepting nesting portions. Although in the illustrated embodiment of FIGS. 1H and 1I the nesting portions 2aa, 2ab, 2ba, 2bb are shown as partial spheres of a particular size, these portions may have any other shape and/or size that prevents the chambers from shifting front to back relative to each other.

In one embodiment, the chambers 2a and 2b are separately constructed and connected together by shrink or labeling wrapping around the bottle 1. In another embodiment (not shown), the bottle 1 includes a clip installed near the bases 18a and 18b of the chambers 2a and 2b that together with other components of the bottle 1 such as the spout 3 and a metering stage 6 (see FIG. 3A) keep the chambers 2a and 2b together. In yet another embodiment, the chambers 2a and 2b are constructed integrally with one another.

The bottle 1 also includes a cap 4 that, as also described in more detail below, prevents the liquids from exiting the bottle 1 during storage after a first use. As also described in more detail below, the cap 4 may also serve as a container into which the mixture of the two liquids may be poured. The cap 4 is removably attached to the bottle 1.

FIGS. 2A-2H illustrate the bottle 1 without the cap 4, which has been removed. As described in more detail below, the pour spout 3 includes first and second pouring channels 5a and 5b through which liquid from the chambers 2a and 2b, respectively, may flow out of the bottle 1. The pour spout 3 may be removably attached to the bottle 1.

FIGS. 3A-3G illustrate the bottle 1 without the pour spout 3, which has been removed. The bottle 1 includes a metering stage 6 that is connected to the chambers 2a and 2b at the mouths 8a and 8b, respectively. As described in more detail below, the metering stage 6 plays a significant role in controlling liquid flow from the chambers 2a and 2b.

When first purchased, the bottle 1 may include at least one safety cover or seal 7 that must be removed prior to dispensing of the liquids from the chambers 2a and 2b. A user may gain access to the seal 7 and thus remove it by first removing the cap 4 and then the spout 3. In the illustrated embodiment, the cover 7 is a plastic cover that removably attaches to the metering stage 6 and effectively covers liquid outlets 9a and 9b and air inlet orifices 10a and 10b of the metering stage 6 to prevent fluid flow through the metering stage 6. Prior to use and when the bottle 1 is on a shelf of a retail store, for example, the safety cover 7 acts as a spacer between the pour spout and the metering stage. In use, the spacer is removed and the spout engages and drops down onto the metering stage.

In another embodiment, the bottle 1 includes a cover in the form of a safety foil that covers the orifices of the metering stage 6. In yet another embodiment, the bottle 1 includes both the plastic cover 7 and a safety foil to cover the orifices of the metering stage 6. In another embodiment (not shown), the bottle 1 includes a cork stopper that covers the orifices of the metering stage 6.

FIGS. 4A-4G illustrate the bottle 1 without the cover 7, which has been removed. The metering stage 6 includes first and second metering stage sections 6a and 6b that are separated by the normal-center plane NOR. Each of the metering stage sections 6a and 6b corresponds to a respective one of the first and second chambers 2a and 2b and is connectable to a respective one of the mouths 8a and 8b of the first and second chambers 2a and 2b. The metering stage 6 includes nozzles 9a and 9b and vent tubes 10a and 10b, which are described in more detail below. In the illustrated embodiment, the metering stage sections 6a and 6b are joined by a bridge 6c. In another embodiment (not shown), the metering stage sections 6a and 6b are separate from one another and are therefore not joined.

After removal of the cover 7, the pour spout 3 may be reattached to the bottle 1. In the illustrated embodiment of FIGS. 4A-4G, the metering stage 6 includes a guide tab 11 disposed between the metering stage sections 6a and 6b. The pour spout 3 has a surface corresponding to the guide tab 11 such that the guide tab 11 contacts the surface of the pour spout 3 and assists in aligning the pour spout 3 and the metering stage 6 when the pour spout 3 is being reattached to the bottle 1.

Figure 5H:
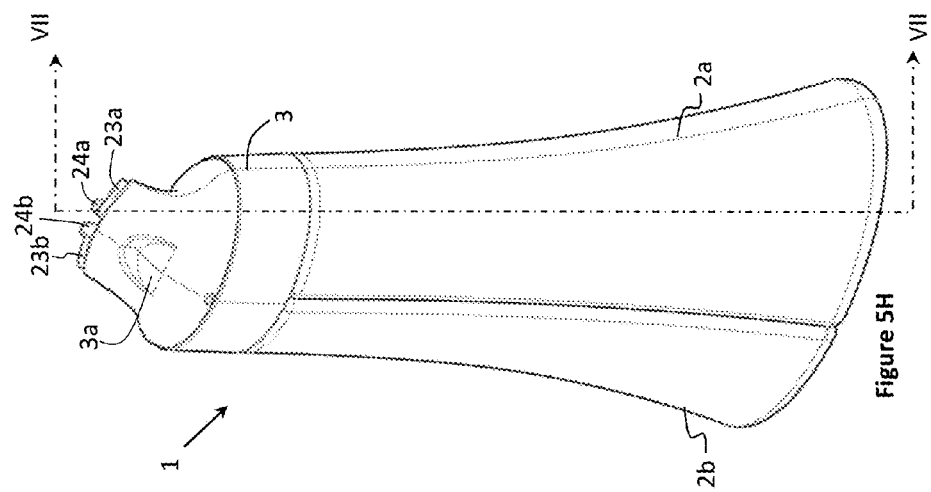
FIG. 5H illustrates a rear perspective view of the exemplary multi-chambered bottle of FIG. 5A.
Figure 5A:
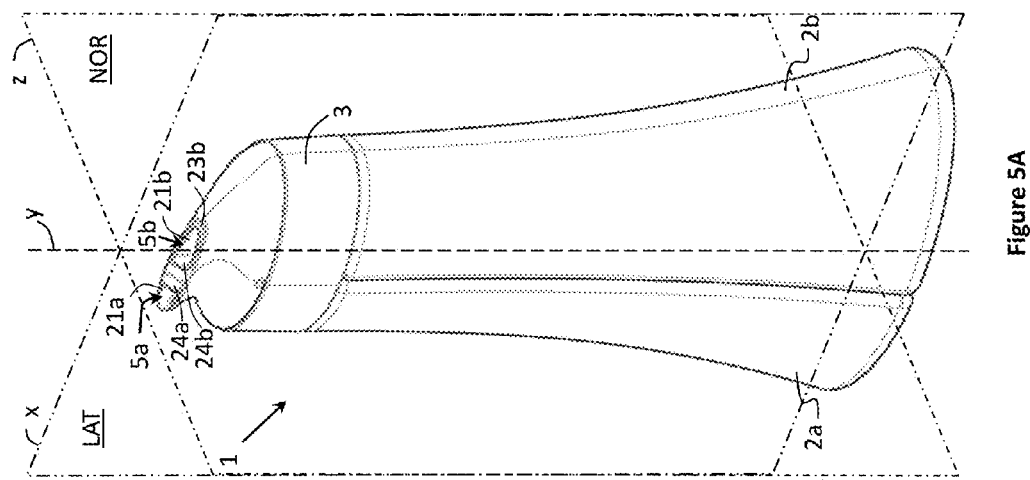
FIG. 5A illustrates a front perspective view of an exemplary multi-chambered bottle without its cap or sealing cover.
Figure 8A:
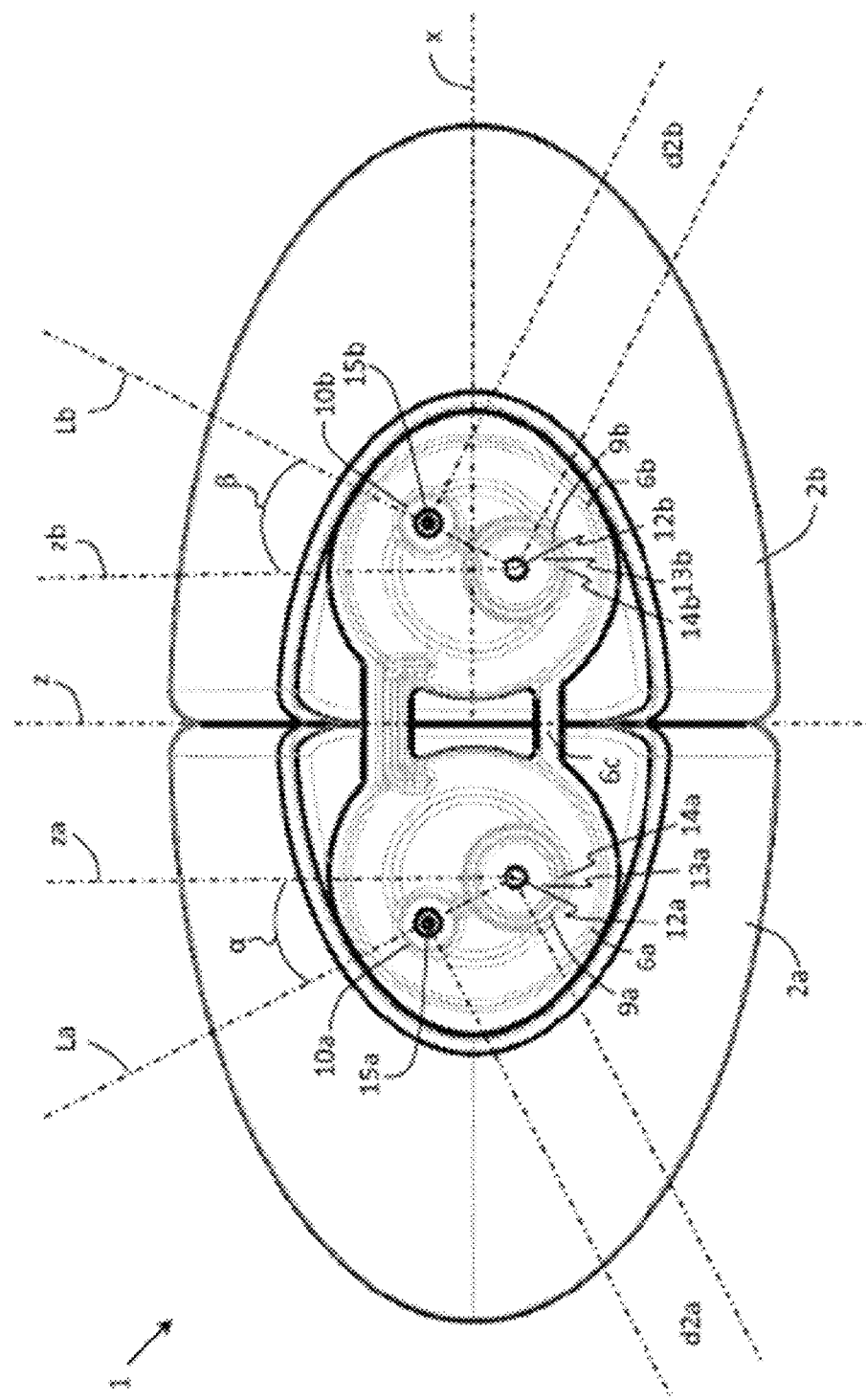
FIG. 8A illustrates a magnified top view of a first exemplary multi-chambered bottle of FIG. 4A.
Figure 8B:
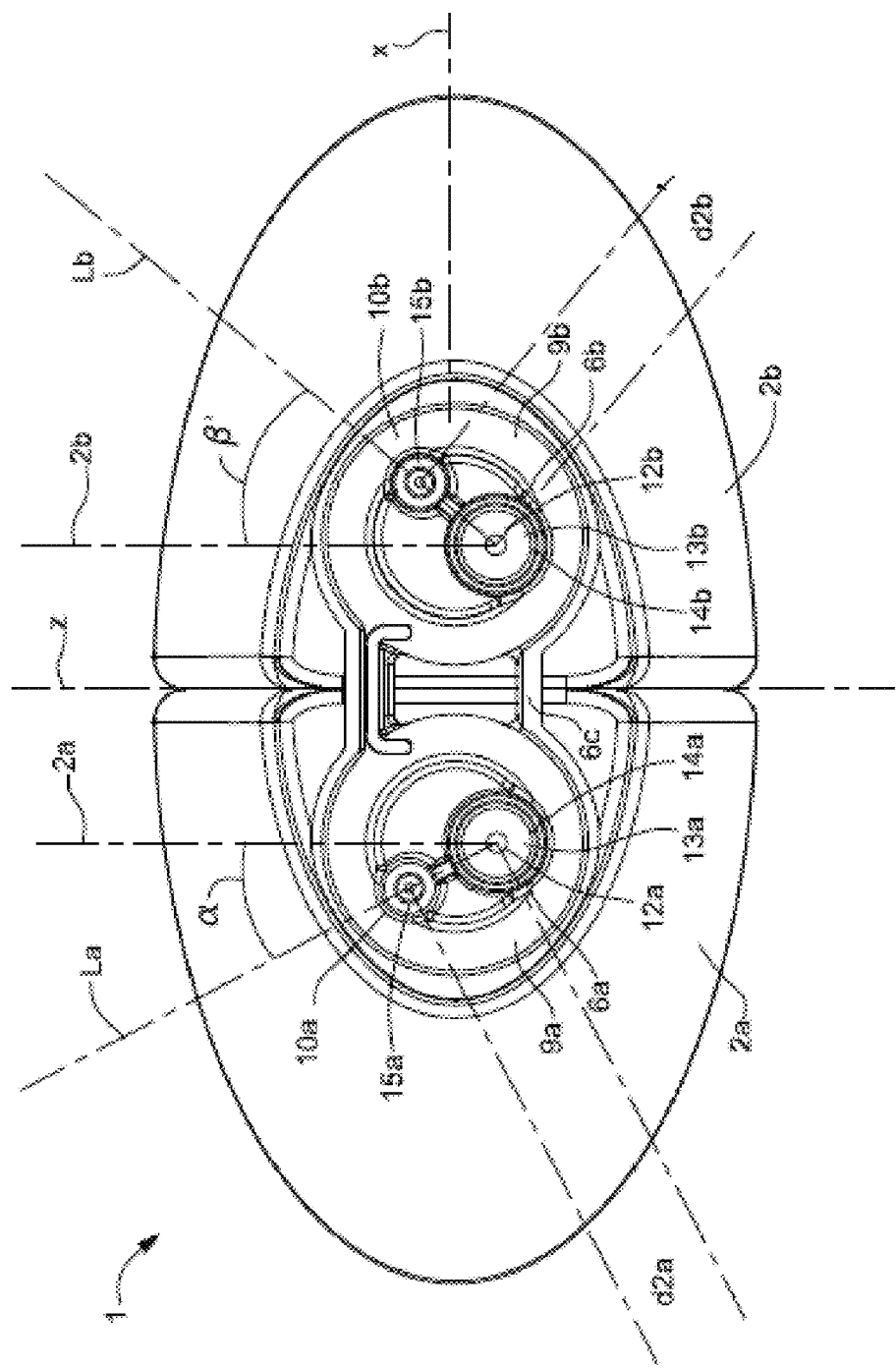
FIG. 8B illustrates a magnified top view of a second exemplary multi-chambered bottle of FIG. 4A.

FIGS. 5A-5H illustrate the bottle 1 with the pour spout 3 reattached to the bottle 1. FIG. 6 illustrates a cross section of the bottle 1 (as shown in FIG. 5D). Notice the contrast between FIGS. 5A-5H and FIGS. 2A-2H and the contrast between FIGS. 11A-11G and FIGS. 1A-1G. FIGS. 1A-1G illustrate the bottle 1 prior to sale as it sits on the shelf. The cover 7 acts as a spacer between the pour spout 3 and the metering stage 6. As a result, FIGS. 1A-1G and FIGS. 2A-2H show a gap G between the pour spout 3 and the chambers 2a and 2b that exposes the shoulders 17a and 17b of the chambers 2a and 2b. The gap G is due to the space occupied by the cover 7 between the pour spout 3 and the metering stage 6. In contrast, because the cover 7 has been removed, FIGS. 11A-11G and FIGS. 5A-5H show no gap between the pour spout 3 and the chambers 2a and 2b and, thus, the shoulders 17a and 17b of the chambers 2a and 2b are no longer exposed. FIG. 7 illustrates another cross section of the bottle 1 (as shown in FIG. 5H). FIGS. 8A and 8B illustrate top views of the bottle 1 with the pour spout 3 removed.

The metering stage section 6a includes the nozzle 9a and the vent tube 10a, while the metering stage section 6b includes the nozzle 9b and the vent tube 10b. For ease of explanation the description below describes mainly the metering stage section 6a, but in general the description below is also applicable to the metering stage section 6b, the nozzle 9b and the vent tube 10b.

The nozzle 9a has a liquid inlet orifice 11a and a liquid outlet orifice 12a. In the illustrated embodiment, the nozzle 9a includes a frustroconical portion 13a that tapers to the liquid outlet orifice 12a as it extends away from the liquid inlet orifice 11a along the longitudinal axis y. The nozzle 9a also includes a rim portion 14a that surrounds the frustroconical portion 13a. In the illustrated embodiment, the rim portion 14a includes a tubular wall that surrounds or intersects the widest end of the frustroconical portion 13a. In other embodiments, the rim portion 14a may include walls of geometries other than tubular (e.g., square, rectangle, etc.)

The particular shape of the nozzles 9a and 9b encourages liquid flow in the outward direction away from the chambers 2a and 2b and discouraged liquids from entering the chamber 2a and 2b through the nozzle 9a and 9b. Moreover, the rim portions 14a and 14b surrounding the frustroconical portions 13a and 13b serve to, in effect, pool or trap any residue liquid in the general area of the respective nozzle 9a or 9b between the frustroconical portions 13a and 13b and the rim portions 14a and 14b outside of the respective chamber 2a or 2b to avoid self-contamination and/or cross-contamination.

The vent tube 10a has an air inlet orifice 15a and an air outlet orifice 16a at opposite ends of the vent tube 10a. The air inlet orifice 15a is disposed outside of the chamber 2a and the air outlet orifice 16a is disposed inside of the chamber 2a so that air may enter the chamber 2a through the vent tube 10a as liquid exits the chamber 2a through the nozzle 9a.

As shown in the embodiment of FIG. 7, the liquid outlet orifice 12a of the nozzle 9a and the air inlet orifice 15a of the vent tube 10a are substantially flush or even with each other; i.e., the liquid outlet orifice 12a and the air inlet orifice 15a are approximately disposed at a same longitudinal distance (i.e., distance along the longitudinal axis y) from any point. For example, the liquid outlet orifice 12a and the air inlet orifice 15a are disposed at the same longitudinal distance d1 from a main body of the metering stage section 6a or from the base 18a of the chamber 2a, etc.

Regarding length of the vent tubes 10a and 10b, in general, longer vent tubes (or more specifically a longer distance d3 from the liquid outlet orifice 12a of the nozzle 9a to the air outlet orifice 16a of the vent tube 10a along the longitudinal axis y) would promote faster flow of air into the chambers 2a and 2b and thus faster flow of liquid from the chambers 2a and 2b. Similarly, in general, shorter vent tubes would promote slower flow of air into the chambers 2a and 2b and thus slower flow of liquid from the chambers 2a and 2b. In general, the vent tubes 10a and 10b need to be long enough to, upon tipping of the bottle 1, achieve sufficient pressure between the air outlet orifices 16a and 16b and the liquid outlet orifices 12a and 12b to overcome forces retaining the liquids in the chambers 2a and 2b and allow the liquids to flow from the bottle 1. Thus, the length of the vent tube 10a controls the start of the pour from the chamber 2a (i.e., how fast after tipping liquid from the chamber 2a pours). Similarly, the length of the vent tube 10b controls the start of the pour from the chamber 2b (i.e., how fast after tipping liquid from the chamber 2b pours). Therefore, the difference or ratio between the lengths of the vent tubes 10a and 10b may be used to control how soon liquid from one chamber pours relative to liquid from another chamber. But, the length of the chambers 2a and 2b as well as other manufacturing considerations may limit the practical length of the vent tubes 10a and 10b.

In the illustrated embodiment of FIG. 7, a distance d3 from the liquid outlet orifice 12a of the nozzle 9a to the air outlet orifice 16a of the vent tube 10a along the longitudinal axis y of the bottle 1 corresponds to about 35% of the height (i.e., distance d4 from the shoulder 17a to the base 18a) of the chamber 2a. In other embodiments, the distance d3 from the liquid outlet orifice 12a to the air outlet orifice 16a along the longitudinal axis y corresponds to at least one of 10% of the height of the chamber 2a, 20% of the height of the chamber 2a, 30% of the height of the chamber 2a, 40% of the height of the chamber 2a, from 25% to 33% of the height of the chamber 2a, from 20% to 40% of the height of the chamber 2a, from 10% to 60% of the height of the chamber 2a, and from 5% to 90% of the height of the chamber 2a.

Another dimension that influences the flow rate of liquid is the location of the air inlet orifices 15a and 15b of the vent tubes 10a and 10b relative to the liquid outlet orifices 12a and 12b of the nozzles 9a and 9b along the lateral x and normal z axes.

As shown in FIGS. 8A and 8B, the vent tube 10a is disposed relative to the nozzle 9a such that a line La crossing a center of the air inlet orifice 15a and a center of the liquid outlet orifice 12a forms an acute angle $\alpha$ with a line za crossing the center of the liquid outlet orifice 12a and parallel to the axis z normal to the bottle 1. In the illustrated embodiments of FIGS. 8A and 8B the angle $\alpha$ is approximately 27°. In another embodiment, the angle $\alpha$ is 25°. In yet another embodiment, the angle $\alpha$ is 35°. In one embodiment, the angle $\alpha$ is 45°. In another embodiment, the angle $\alpha$ is 54°. In yet another embodiment, the angle $\alpha$ is 60°. In one embodiment, the angle $\alpha$ is between 20° and 30°. In another embodiment, the angle $\alpha$ is between 10° and 50°. In yet another embodiment, the angle $\alpha$ is between 5° and 85° inclusive. In one embodiment, the angle $\alpha$ is −25°. In another embodiment, the angle $\alpha$ is −27°. In yet another embodiment, the angle $\alpha$ is −35°. In one embodiment, the angle $\alpha$ is −45°. In another embodiment, the angle $\alpha$ is −54°. In yet another embodiment, the angle $\alpha$ is −60°. In one embodiment, the angle $\alpha$ is between −20° and −30°. In another embodiment, the angle $\alpha$ is between −10° and −50°. In yet another embodiment, the angle $\alpha$ is between −5° and −85° inclusive.

Similarly, the vent tube 10b is disposed relative to the nozzle 9b such that a line Lb crossing a center of the air inlet orifice 15b and a center of the liquid outlet orifice 12b forms an acute angle $\beta$ with a line zb crossing the center of the liquid outlet orifice 12b and parallel to the axis z normal to the bottle 1. In the illustrated embodiment of FIG. 8A the angle β is approximately 27°. In another embodiment, the angle β is 25°. In yet another embodiment, the angle β is 35°. In one embodiment, the angle β is 45°. In another embodiment, the angle β is 54°. In yet another embodiment, the angle β is 60°. In one embodiment, the angle β is between 20° and 30°. In another embodiment, the angle β is between 10° and 50°. In yet another embodiment, the angle β is between 5° and 85° inclusive. In one embodiment, the angle β is −25°. In another embodiment, the angle β is −27°. In yet another embodiment, the angle β is −35°. In one embodiment, the angle v is −45°. In another embodiment, the angle β is −54°. In yet another embodiment, the angle β is −60°. In one embodiment, the angle β is between −20° and −30°. In another embodiment, the angle β is between −10° and −50°. In yet another embodiment, the angle β is between −5° and −85° inclusive.

In the illustrated embodiment shown in FIG. 8A, the acute angle α of the metering stage section 6a is the same angle as the corresponding angle β of the metering stage section 6b. In the embodiment shown in FIG. 8B, the acute angle α of the metering stage section 6a is different from the corresponding angle β' of the metering stage section 6b.

Also, in the illustrated embodiment, a distance d2a from the center of the liquid outlet orifice 12a to the center of the air inlet orifice 15a corresponds to at least one of 5% of the length of the vent tube 10a, 10% of the length of the vent tube 10a, 15% of the length of the vent tube 10a, 20% of the length of the vent tube 10a, 25% of the length of the vent tube 10a, 33% of the length of the vent tube 10a 50% of the length of the vent tube 10a, from 10% to 25% of the length of the vent tube 10a, and from 5% to 50% of the length of the vent tube 10a. Similarly, a distance d2b from the center of the liquid outlet orifice 12b to the center of the air inlet orifice 15b corresponds to at least one of 5% of the length of the vent tube 10b, 10% of the length of the vent tube 10b, 15% of the length of the vent tube 10b, 20% of the length of the vent tube 10b, 25% of the length of the vent tube 10b, 33% of the length of the vent tube 10b 50% of the length of the vent tube 10b, from 10% to 25% of the length of the vent tube 10b, and from 5% to 50% of the length of the vent tube 10b.

As shown in the embodiment of FIG. 7, the air outlet orifice 16a is formed by a flange 19a expanding radially inwards from a wall of the vent tube 10a. The flange 19a reduces the diameter of the air outlet orifice 16a relative to the inner diameter of the vent tube 10a adjacent to the flange 19a which provides additional control over liquid flow.

Characteristics (location, dimensions, orifice 12a size, etc.) of the nozzle 9a relative to the nozzle 9b, characteristics (location, dimensions, orifice 12b size, etc.) of the vent tube 10a relative to the vent tube 10b, the angle α relative to the angle β, and the distance d2a relative to the distance d2b may all be manipulated to control liquid flow from the chamber 2a relative to the chamber 2b. For example, these variables may be used to control liquid flow as to provide a 50%-50% ratio of liquids regardless of the characteristics (density, surface tension, etc.) of the liquids. In another example, these variables may be used to control liquid flow as to provide ratios other than 50%-50% for liquids having similar characteristics. Also, the specific construction of the vent tubes 10a and 10b and their specific location relative to the nozzles 9a and 9b may be used to promote an even start to liquid flow between the two liquids from the chambers 2a and 2b regardless of the characteristics of the liquids and the pouring angle or rotation of the bottle 1.

For example, reducing the diameter of the liquid orifice 12a, 12b corresponding to one chamber 2a, 2b will reduce the 50%-50% ratio in favor of the liquid in the opposing chamber 2a, 2b. Correspondingly, increasing or decreasing both orifices 12a and 12b simultaneously can, respectively, increase or decrease the overall flow rate while maintaining a constant mixture ratio. If the desired ratio is other than 50%-50%, in order to change the flow rate while keeping the ratio unchanged, the absolute changes to the orifice diameter will not be identical between the two chambers 2a, 2b.

Adjusting the vent tube length d3 to be shorter will, in general, delay the start of the pour once the bottle 1 is tipped. Adjusting the tube 10 to be excessively short will results in making the flow start and stability unreliable. Adjusting the tube 10 to be excessively long may have adverse effects on manufacturability and end assembly cost.

When pouring the bottle 1 off-axis (i.e., the chamber 2a is higher or lower with respect to the direction of gravity than the chamber 2b), increasing the angle α or the angle β of FIGS. 8A and 8B generally will cause liquid to flow from the chamber that is higher to begin flow prior to flow from the chamber that is lower.

In general, liquids with higher viscosities will require a larger liquid orifice 12a, 12b to achieve the same flow rate of a less viscous liquid (i.e., all else being equal).

In general, liquids with a high surface energy will require a small vent orifice 16a, 16b to maintain an identical pouring start time as compared to a liquid with lower surface energy (i.e., all else being equal).

FIGS. 5A-5H, 6 and 7 provide additional detail regarding the pour spout 3. The pour spout 3 includes the first and second pouring channels 5a and 5b. Each of the pouring channels 5a and 5b corresponds to a respective one of the nozzles 9a and 9b of the first and second metering stage sections 6a and 6b. The pouring channels 5a and 5b include liquid inlets 20a and 20b and liquid outlets 21a and 21b, respectively. For ease of explanation the description below describes mainly the pouring channel 5a, the liquid inlet 20a and the liquid outlet 21a, but in general the description below is also applicable to the pouring channel 5b, the liquid inlet 20b and the liquid outlet 21b.

The liquid inlet 20a connects to the respective nozzle 9a such that liquid may flow from the nozzle 9a, enter the pouring channel 5a through the liquid inlet 20a and exit the pouring channel 5a through the liquid outlet 21a.

In many applications for the multi-chambered bottle 1 it may be important that the two liquids meet a short distance from the liquid outlets 21a and 21b and that they mix "in the air" prior to landing in a receiving container such as the cap 4. For example, combining and substantially mixing the streams of liquids in the air upon dispensing may avoid having to mix the liquids in the cap 4 after pouring.

To this end, at least a portion of a wall 22a of the pouring channel 5a slopes in a direction towards the normal-center plane NOR of the bottle 1 as it extends from the liquid inlet 20a to the liquid outlet 21a (see FIG. 6). This pushes at least some of the liquid flowing through the pouring channel 5a towards the normal-center plane NOR of the bottle 1. Moreover, the liquid outlet 21a narrows as it extends away from the normal-center plane NOR along the latitudinal axis x (see FIG. 5A). This causes liquid flowing from the pouring channel 5a to bridge or web at the narrowing, further pushing the liquid to flow from the liquid outlet 21a towards the normal-center plane NOR. This, in effect, causes liquid to flow from the liquid outlet 21a of the pouring channel 5a towards liquid flowing from the liquid outlet 21b of the pouring channel 5b. This causes the liquids to meet a short distance from the liquid outlets 21a and 21b and to mix "in the air" prior to landing in a receiving container such as the cap 4.

In many applications for the multi-chambered bottle 1 it may be important that the two liquids meet only after they have exited the bottle 1 and that one liquid does not contaminate itself or another liquid within the bottle 1.

To this end, the pouring channels 5a and 5b include stepped rims 23a and 23b that surround at least a portion of the perimeter of the liquid outlets 21a and 21b, respectively. The pouring channels 5a and 5b also include dividers 24a and 24b disposed adjacent a portion of the liquid outlets 21a and 21b nearest to the normal-center plane NOR of the bottle 1. Any residue liquid in the vicinity of the liquid outlets 21a and 21b will tend to pool at the steps of the rims 23a and 23b. Any residue liquid that may begin to flow towards the opposite liquid outlet along the stepped rims 23a and 23b will be stopped from reaching the opposite liquid outlet by the corresponding divider 24a or 24b.

In addition, at least a portion of the wall 22a of the pouring channel 5a slopes in a direction away from the latitudinal-center plane LAT of the bottle 1 as it extends from the liquid inlet 20a to the liquid outlet 21a. This reduces the angle that the bottle 1 must be tipped to cause liquid to pour from the spout 3.

Figure 10:
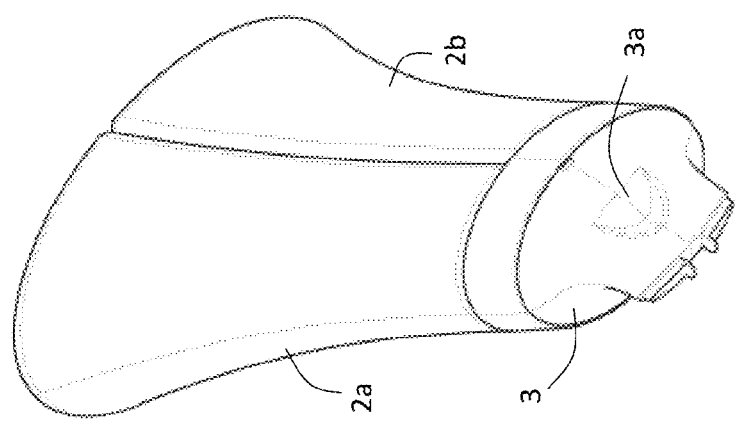
FIGS. 9 and 10 illustrate perspective views of the exemplary multi-chambered bottle to illustrate pouring angles.
Figure 9:
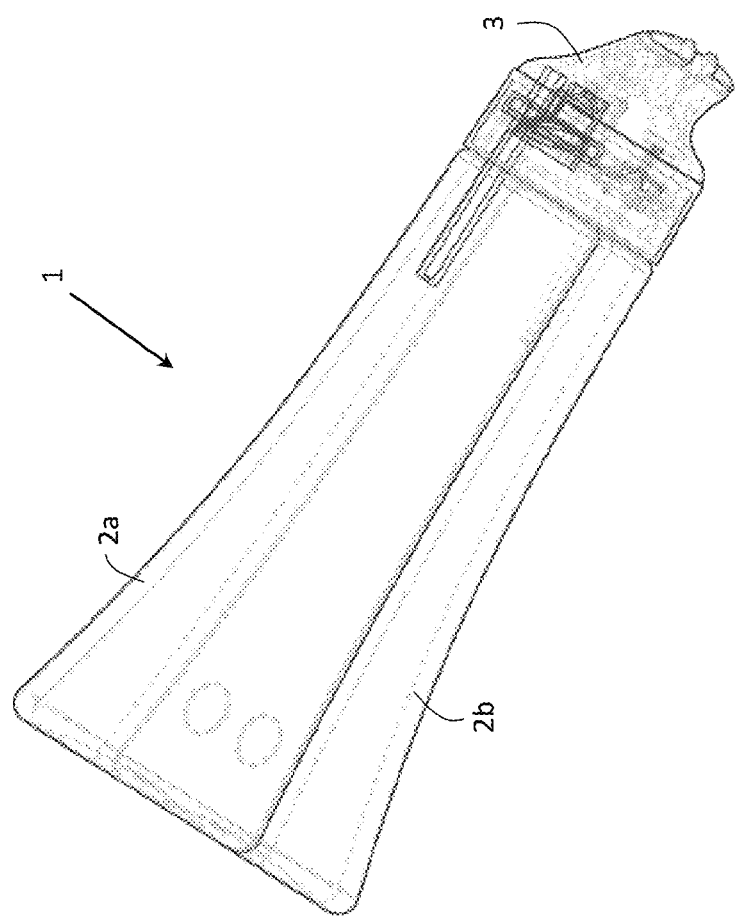
Figure 11A:
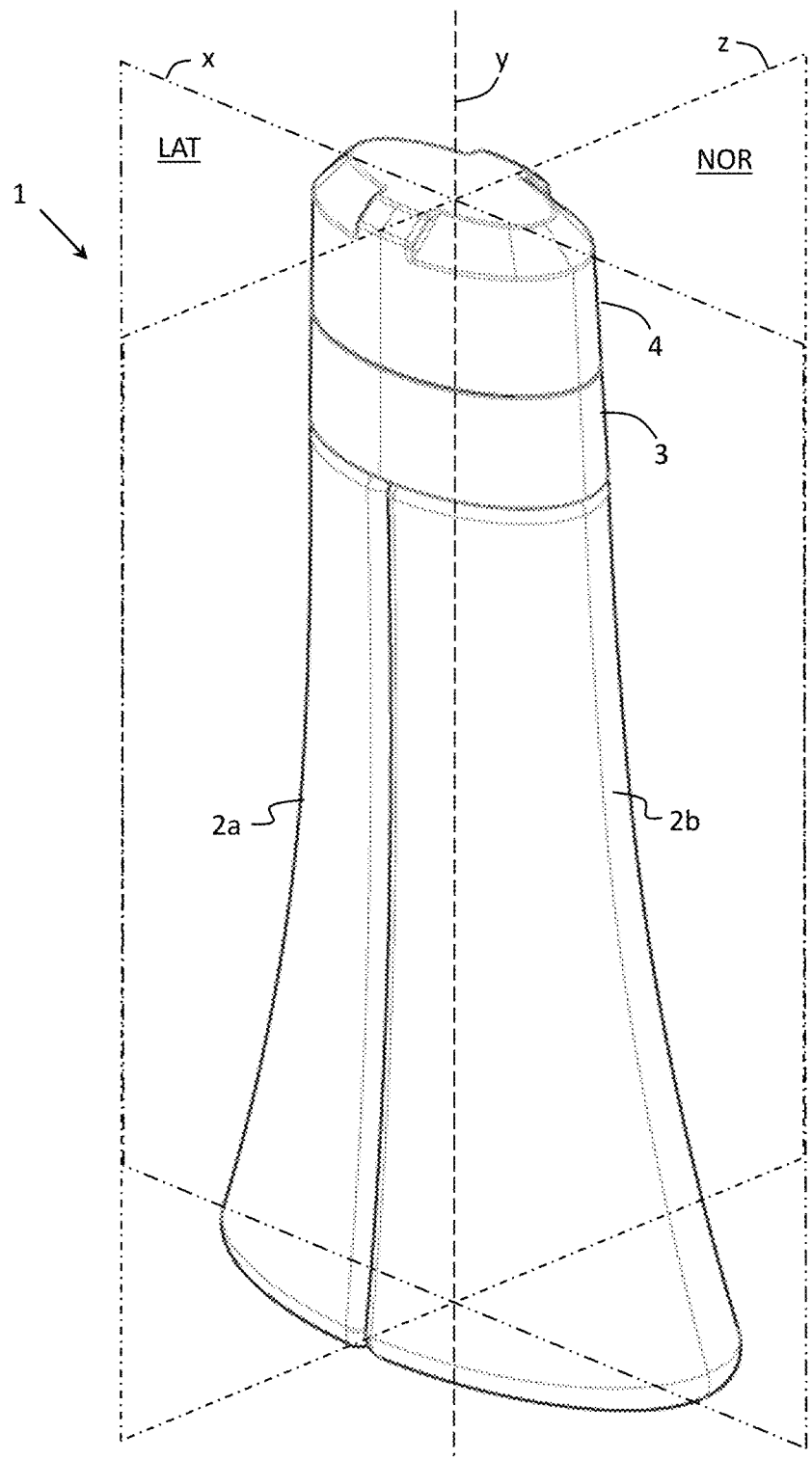
FIG. 11A illustrates a front perspective view of an exemplary multi-chambered bottle without the sealing cover.

FIGS. 9 and 10 illustrate the exemplary multi-chambered bottle 1 tilted to pour liquids from the chambers 2a and 2b. Upon tilting of the bottle 1, the liquids flow assisted by gravity from their respective chambers 2a, 2b and out of the pour spout 3. In the illustrated embodiment, the spout 6 includes a grip 3a that corresponds to a finger of a user. When pouring the bottle 1, ideally the chambers 2a and 2b would be even with respect to the direction of gravity; i.e., the chamber 2a would not be higher or lower than the chamber 2b. The bottle 1, however, performs adequately within a range of angles different from even. The grip 3a is configured to promote that the user tilts the bottle 1 such that the chambers 12a and 12b remain within this range. When the user tilts the bottle 1 with his finger on the grip 3a, the grip 3a performs together with the hand of the user to promote the user to tilt the bottle 1 within the range. In one embodiment, the grip 3a performs to promote the user to tilt the bottle 1 a range of angles within 45 degrees of the ideal position where the chambers 2a and 2b would be even with respect to the direction of gravity; i.e., the grip 3a performs to promote the user to tilt the bottle 1 such that the angle formed by a line perpendicular to the direction of gravity and the line x (see FIGS. 8A and 8B) is within a range of 0 to 45 degrees inclusive.

Construction of the bottle 1 including the specific constructions of the pour spout 3 and the metering stage 6 as disclosed above permits the bottle 1 to be tilted and even twisted at various angles of every axis x, y or z without substantial degradation to the flow ratios of the liquid in the first chamber 2a relative to the liquid in the second chamber 2b and without cross-contamination.

FIGS. 11A-11G illustrate the exemplary bottle 1 in storage configuration after the first use. The cap 4 has been reinstalled on the bottle 1. The interface of the cap 4 with the spout 3 is shaped to substantially seal the spout 3 when the cap 4 is installed on the bottle 1. Portions of the cap 4 correspond to the liquid outlets 21a and 21b of the pour spout 3 including the stepped rims 23a and 23b and the dividers 24a and 24b. Thus when the cap 4 is installed on the bottle 1 these portions of the cap 4 impede liquid flow through the liquid outlets 21a and 21b of the pour spout 3.

In one embodiment, the cap 4, when not installed on the bottle 1, may be used as a container into which the mixture of the two liquids may be poured. The cap 4 may also include a dosing step that serves as an indicator for a dosing amount of the combination of liquids poured from the chambers 2a and 2b.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A multi-chambered bottle comprising:
   first and second chambers;
   a metering stage including:
      first and second metering stage sections connected to respective mouths of the first and second chambers and separated by a normal-center plane of the bottle, each metering stage section corresponding to a respective one of the first and second chambers, each metering stage section comprising:
         a nozzle that tapers to a liquid outlet orifice as it extends from a liquid inlet orifice along a longitudinal axis of the bottle, and a rim portion that surrounds the liquid outlet orifice, and
         a vent tube having an air inlet orifice and an air outlet orifice at opposite ends of the vent tube, the air inlet orifice disposed outside of the respective chamber and the air outlet orifice disposed inside of the respective chamber, the vent tube disposed relative to the nozzle such that a line crossing a center of the air inlet orifice and a center of the liquid outlet orifice forms an acute angle with a line crossing the center of the liquid outlet orifice and parallel to a normal axis of the bottle; and
   a pour spout releasably attachable relative to the metering stage and including:
      first and second pouring channels, each pouring channel corresponding to a respective one of the nozzles of the first and second metering stage sections, each pouring channel including:
         a liquid inlet that connects to the respective nozzle, and a liquid outlet that has an opening that narrows as the opening extends away from the normal-center plane of the bottle along a latitudinal axis of the bottle, a stepped rim that surrounds at least a portion of the opening and a divider disposed adjacent a portion of the opening nearest to the normal-center plane of the bottle, wherein at least a portion of a wall of the pouring channel slopes in a direction towards the normal-center plane of the bottle as it extends from the liquid inlet to the liquid outlet.

2. The bottle of claim 1, wherein one of the first and the second chambers includes a first nesting portion that protrudes from the one of the first and the second chambers and the other of the first and the second chambers includes a second nesting portion that accepts the first nesting portion.

3. The bottle of claim 1, wherein the rim portion that surrounds the liquid outlet orifice of the nozzle includes a tubular wall that intersects a widest portion of the nozzle.

4. The bottle of claim 1, wherein, in at least one of the metering stage sections, a distance from the liquid outlet orifice of the nozzle to the air outlet orifice of the vent tube along the longitudinal axis of the bottle corresponds to at least one of 10% of the height of the chamber, 20% of the height of the chamber, 30% of the height of the chamber, 40% of the height of the chamber, from 25% to 33% of the height of the chamber, from 20% to 40% of the height of the chamber, from 10% to 60% of the height of the chamber, or from 5% to 90% of the height of the chamber.

5. The bottle of claim 1, wherein, in at least one of the metering stage sections, the liquid outlet orifice of the nozzle and the air inlet orifice of the vent tube are same distance from the base of the chamber.

6. The bottle of claim 1, wherein, in at least one of the metering stage sections, the liquid outlet orifice of the nozzle and the air inlet orifice of the vent tube are same distance from the base of the chamber, and a distance from the center of the liquid outlet orifice of the nozzle to the center of the air inlet orifice of the vent tube corresponds to at least one of 5% length of the vent tube, 10% of the length of the vent tube, 20% of the length of the vent tube, 25% of the length of the vent tube, 33% of the length of the vent tube, 50% of the length of the vent tube, from 10% to 25% of the length of the vent tube, or from 5% to 50% of the length of the vent tube.

7. The bottle of claim 1, wherein the acute angle formed by the line crossing the center of the air inlet orifice and the center of the liquid outlet orifice with the line crossing the center of the liquid outlet orifice and parallel to the normal axis of the bottle for the first metering stage section is different from the acute angle formed by the line crossing the center of the air inlet orifice and the center of the liquid outlet orifice with the line crossing the center of the liquid outlet orifice and parallel to the normal axis of the bottle for the second metering stage section.

8. The bottle of claim 1, wherein, in at least one of the metering stage sections, the air outlet orifice is formed by a flange expanding radially inwards from a wall of the vent tube such that a diameter of the air outlet orifice is smaller than an inner diameter of the vent tube adjacent to the flange.

9. The bottle of claim 1, the metering stage comprising:
at least one guide tab disposed between the metering stage sections, wherein the pour spout has a surface corresponding to the guide tab such that the guide tab contacts the surface and assists in aligning the pour spout and the metering stage when the pour spout is being installed on the bottle.

10. The bottle of claim 1, wherein at least a portion of the wall of the pouring channel slopes in a direction away from a latitudinal-center plane of the bottle as it extends from the liquid inlet to the liquid outlet.

11. The bottle of claim 1, comprising:
a cap releasably attachable relative to the pour spout, wherein portions of the cap correspond to the liquid outlets of the pour spout including the stepped rims and the dividers such that when the cap is installed on the bottle the portions of the cap impede liquid flow through the liquid outlets of the pour spout.

12. The bottle of claim 1, comprising at least one of a spacer or a foil removably disposed between the metering stage and the pour spout for storage and covering at least the air inlet orifices of the vent tubes and the liquid outlet orifices of the nozzles.

13. A metering stage for a multi-chambered bottle including first and second chambers, the metering stage comprising:
first and second metering stage sections connectable to respective mouths of the first and second chambers such that the first and second metering stage sections are separated by a normal-center plane of the bottle, each metering stage section corresponding to a respective one of the first and second chambers, each metering stage section comprising:
a nozzle having a liquid inlet orifice and a liquid outlet orifice, and
a vent tube having an air inlet orifice and an air outlet orifice at opposite ends of the vent tube, the air inlet orifice to be disposed outside of the respective chamber and the air outlet orifice to be disposed inside of the respective chamber, the vent tube disposed relative to the nozzle such that a line crossing a center of the air inlet orifice and a center of the liquid outlet orifice forms an acute angle with a line crossing the center of the liquid outlet orifice and parallel to a normal axis of the bottle.

14. The metering stage of claim 13, wherein at least one of the nozzles of the first and second metering stage sections includes a rim portion that at least partially surrounds the liquid outlet orifice to collect liquid from the liquid outlet orifice.

15. The metering stage of claim 14, wherein the rim portion completely surrounds the liquid outlet orifice.

16. The metering stage of claim 13, wherein, in at least one of the metering stage sections, the liquid outlet orifice of the nozzle and the air inlet orifice of the vent tube are same distance from a main body of the metering stage section.

17. The metering stage of claim 13, wherein, in at least one of the metering stage sections, the liquid outlet orifice of the nozzle and the air inlet orifice of the vent tube are same distance from a main body of the metering stage section and a distance from the center of the liquid outlet orifice of the nozzle to the center of the air inlet orifice of the vent tube corresponds to at least one of 5% length of the vent tube, 10% length of the vent tube, 20% length of the vent tube, 25% length of the vent tube, 33% length of the vent tube, 50% length of the vent tube, from 10% to 25% length of the vent tube, and from 5% to 50% length of the vent tube.

18. The metering stage of claim 13, wherein the acute angle formed by the line crossing the center of the air inlet orifice and the center of the liquid outlet orifice with the line crossing the center of the liquid outlet orifice and parallel to the normal axis of the bottle for the first metering stage section is different from the acute angle formed by the line crossing the center of the air inlet orifice and the center of the liquid outlet orifice with the line crossing the center of the liquid outlet orifice and parallel to the normal axis of the bottle for the second metering stage section.

19. The metering stage of claim 13, wherein, in at least one of the metering stage sections, the air outlet orifice is formed by a flange expanding radially inwards from a wall of the vent tube such that a diameter of the air outlet orifice is smaller than an inner diameter of the vent tube adjacent to the flange.

20. The metering stage of claim 13, wherein first and second metering stage sections are joined by a bridge section such that the metering stage connected to the mouths of the first and second chambers acts as a structural entity that at least in part keeps the first and second chambers together.

21. A pour spout for a multi-chambered bottle including first and second chambers, the pour spout comprising:
    first and second pouring channels, each pouring channel corresponding to a respective nozzle of a metering stage of the multi-chambered bottle, each pouring channel including:
        a liquid inlet connectable to the respective nozzle, and
        a liquid outlet that has an opening that narrows as the opening extends away from the normal-center plane of the bottle along a latitudinal axis of the bottle,
    wherein at least a portion of a wall of the pouring channel slopes in a direction towards a normal-center plane of the bottle as it extends from the liquid inlet to the liquid outlet and in a direction away from a latitudinal-center plane of the bottle as it extends from the liquid inlet to the liquid outlet.

22. The pour spout of claim 21 including a grip for a finger of a user, the grip configured to promote that the user tilts the bottle a range of 45 degrees from a position in which first and second chambers of the bottle would be even with respect to the direction of gravity.

23. The pour spout of claim 21 comprising:
    a stepped rim that surrounds at least a portion of the opening and a divider disposed adjacent a portion of the opening nearest to the normal-center plane of the bottle.

* * * * *